United States Patent
Yotani et al.

(10) Patent No.: US 7,245,070 B2
(45) Date of Patent: Jul. 17, 2007

(54) FLAT DISPLAY

(75) Inventors: Junko Yotani, Mie (JP); Sashiro Uemura, Mie (JP)

(73) Assignee: Noritake Co., Ltd., Aichi (JP)

( * ) Notice: Subject to any disclaimer, the term of this patent is extended or adjusted under 35 U.S.C. 154(b) by 296 days.

(21) Appl. No.: 11/083,511

(22) Filed: Mar. 17, 2005

(65) Prior Publication Data

US 2006/0082283 A1    Apr. 20, 2006

(30) Foreign Application Priority Data

Mar. 19, 2004    (JP)    ............................. 2004-080740

(51) Int. Cl.
*H01J 1/62* (2006.01)
(52) U.S. Cl. ..................................... 313/495; 313/292
(58) Field of Classification Search ................ 313/495, 313/292
See application file for complete search history.

(56) References Cited

U.S. PATENT DOCUMENTS 4,020,381 A * 4/1977 Oess et al. ................... 313/302
6,046,539 A * 4/2000 Haven et al. ................ 313/461
6,624,566 B2   9/2003 Uemura et al.
2002/0163297 A1* 11/2002 Elledge ....................... 313/495
2003/0067259 A1* 4/2003 Nishimura ................... 313/310

FOREIGN PATENT DOCUMENTS

JP    08-293270    11/1996
JP    2002-343281    11/2002

* cited by examiner

*Primary Examiner*—Vip Patel
(74) *Attorney, Agent, or Firm*—Blakely Sokoloff Taylor & Zafman

(57) ABSTRACT

A flat display includes a front glass plate, substrate, cathode, gate electrode, a phosphor screen and metal-backed film, and matrix-like spacer. The front glass plate is at least partly transparent. The substrate is arranged to oppose the front glass plate through a vacuum space. The cathode is formed on the substrate and has an electron-emitting source made of nano tube fibers. The gate electrode has an electron-passing hole in a direction perpendicular to the substrate and is arranged in the vacuum space away from the cathode to oppose the substrate. The phosphor screen and metal-backed film are sequentially stacked on a surface of the front glass plate which opposes the substrate. The matrix-like spacer is stacked between the gate electrode and front glass plate and has a plurality of openings each corresponding to the electron-passing hole.

7 Claims, 4 Drawing Sheets

FLAT DISPLAY

BACKGROUND OF THE INVENTION

The present invention relates to a flat display in which electrons emitted from an electron-emitting source are collided against phosphors to emit light.

In general, as a display device such as a FED (Field Emission Display) or a flat vacuum fluorescent display in which electrons emitted from an electron-emitting source serving as a cathode are collided against a light-emitting portion formed of phosphors on a counterelectrode to emit light, a flat panel display is available. In recent years, as a flat panel display of this type, various types that use nano tube fibers, e.g., carbon nano tubes or carbon nano fibers, as the electron-emitting source have been proposed.

A conventional flat display described in Japanese Patent Laid-Open No. 2002-343281 (reference 1) has a substrate 101 made of glass or the like and a front glass plate 103 which is at least partly transparent, as shown in FIG. 5. The substrate 101 and front glass plate 103 are arranged to oppose each other through a spacer glass frame (not shown) at a predetermined gap, and are adhered to the spacer glass frame with low-melting frit glass to form part of an envelope. The interior of the envelope is held at a vacuum degree on the order of $10^{-5}$ Pa. A gate electrode structure 120 is disposed in the envelope to be substantially parallel to the substrate 101 and front glass plate 103.

A plurality of substrate ribs 102 are formed on one surface of the substrate 101 to be parallel to each other at predetermined intervals. Band-like cathodes 110, to the surface of which nano tube fibers, e.g., carbon nano tubes or carbon nano fibers, are fixed as an electron-emitting source and which are made of a metal member such as a 426 alloy, are arranged in regions sandwiched by the substrate ribs 102 on the substrate 101, such that the cathodes 110 are leveled with the substrate ribs 102.

A plurality of thin plate-like front ribs 104 are formed at predetermined intervals on that surface of the front glass plate 103 which opposes the substrate 101, in a direction perpendicular to the substrate ribs 102 and cathodes 110. The end faces of the front ribs 104 which oppose the substrate 101 have thin, elongated rectangular shapes. A predetermined number of sets each including red-, green-, and blue-emitting phosphor screens 105R, 105G, and 105B in this order are arranged in those regions on the front glass plate 103 which are sandwiched by the front ribs 104. Metal-backed films 106 to serve as anodes are formed on those surfaces of the phosphor screens 105R, 105G, and 105B which oppose the glass substrate 101.

The front ribs 104 are formed by repeated printing, e.g., screen printing, on the front glass plate 103 until the front ribs 104 reach a predetermined height. Regarding the front ribs 104, a direction perpendicular to the main surface of the front glass plate 103 (the moving direction of electrons extracted from the cathodes 110 (to be described later)) will be referred to as "the direction of height". The direction of the plate thickness of the front ribs 104 (the longitudinal direction of the substrate ribs 102) will be referred to as "the widthwise direction", and a direction perpendicular to "the widthwise direction" and "the direction of height" (the longitudinal direction of gate electrodes 123 (to be described later)) will be referred to as "the lengthwise direction" hereinafter.

The gate electrode structure 120 disposed in the envelope is sandwiched between the end faces of the substrate ribs 102 on the substrate 101 and the end faces of the front ribs 104 of the front glass plate 103. The gate electrode structure 120 includes a glass plate 121 parallel to the substrate 101, a field control electrode 122 formed on the front glass plate 103 side surface of the glass plate 121, the band-like gate electrodes 123 formed on the substrate 101 side surface of the glass plate 121 to respectively correspond to the phosphor screens 105B, 105G, and 105R, and an insulating layer 124 formed on the substrate 101 side surface of the glass plate 121 to cover the gate electrodes 123. A plurality of electron-passing holes 125, through which the field control electrode 122, glass plate 121, gate electrodes 123, and insulating layer 124 communicate with each other in "the direction of height", are formed in those regions of the gate electrode structure 120 where the gate electrodes 123 and cathodes 110 intersect.

The field control electrode 122 which is in contact with the front ribs 104 electrically shields the gate electrodes 123 and cathodes 110. A potential difference between the cathodes 110 and the metal-backed films 106 which serve as anode electrodes generates no electrical field in the region where the field control electrode 122 is formed. Thus, any damage due to electrical discharge to the electron-emitting source, particularly to the surface of the electron-emitting source, is prevented.

In the flat display with the above structure, a predetermined potential difference is supplied between the gate electrode structure 120 and cathodes 110 such that the gate electrode structure 120 side has a positive potential. Thus, electrons extracted from those regions of the cathodes 110 which intersect the gate electrodes 123 are emitted from the electron-passing holes 125. At this time, if a positive potential (acceleration potential) is applied to the metal-backed films 106, the electrons emitted from the electron-passing holes 125 are accelerated toward the metal-backed films 106, and collide against the phosphor screens 105B, 105G, and 105R through the metal-backed films 106 to emit light.

In the conventional flat display, the front ribs 104 formed on the front glass plate 103 cooperate with the substrate ribs 102 (and cathodes 110) formed on the substrate 101 to sandwich the gate electrode structure 120. The front ribs 104 also have the function of supporting the front glass plate 103, so the front glass plate 103 will not be broken by the pressure difference between the interior of the envelope and the outside, and the function of defining the distance between the metal-backed films 106 serving as the anodes and the field control electrode 122.

The front ribs 104 having the above functions are formed by repeating screen printing, as described above, so that, for example, they each have a width of 50 µm and that the distance between the gate electrodes 123 of the gate electrode structure 120 and the metal-backed films 106 is 2.0 mm to 4.0 mm.

To further improve the resolution of the conventional flat display as described above, the regions where the phosphor screens 105B, 105G, and 105R are arranged must be finer. For this purpose, it is indispensable to decrease the widths of the front ribs 104. As described above, however, of the shape of the end face of each front rib 104, the size in the widthwise direction is smaller than the size in the lengthwise direction. With the conventional method of repeating screen printing, to form narrower front ribs 104 at narrower pitches is limited. If the front ribs 104 are to be formed with narrower pitches, they cannot reach the predetermined height.

If the narrow-pitch front ribs 104 having a height smaller than in the conventional case are applied to a flat display, the gap between the anodes and field control electrode 122 becomes shorter than in the conventional case. When a high voltage of, e.g., about 10 keV is applied to the anodes, the field control electrode 122 cannot electrically shield the gate electrodes 123 sufficiently. Abnormal electrical discharge occurs between the anodes and gate electrodes 123 to damage the electron-emitting source.

SUMMARY OF THE INVENTION

It is an object of the present invention to provide a flat display having a high resolution.

In order to achieve the above object, according to the present invention, there is provided a flat display comprising a front glass plate which is at least partly transparent, a substrate which is arranged to oppose the front glass plate through a vacuum space, a cathode which is formed on the substrate and has an electron-emitting source made of nano tube fibers, a gate electrode which has an electron-passing hole in a direction perpendicular to the substrate and is arranged in the vacuum space away from the cathode to oppose the substrate, a phosphor screen and anode sequentially stacked on a surface of the front glass plate which opposes the substrate, and a matrix-like spacer which is stacked between the gate electrode and front glass plate and has a plurality of openings each corresponding to the electron-passing hole.

DESCRIPTION OF THE PREFERRED EMBODIMENTS

Figure 5:
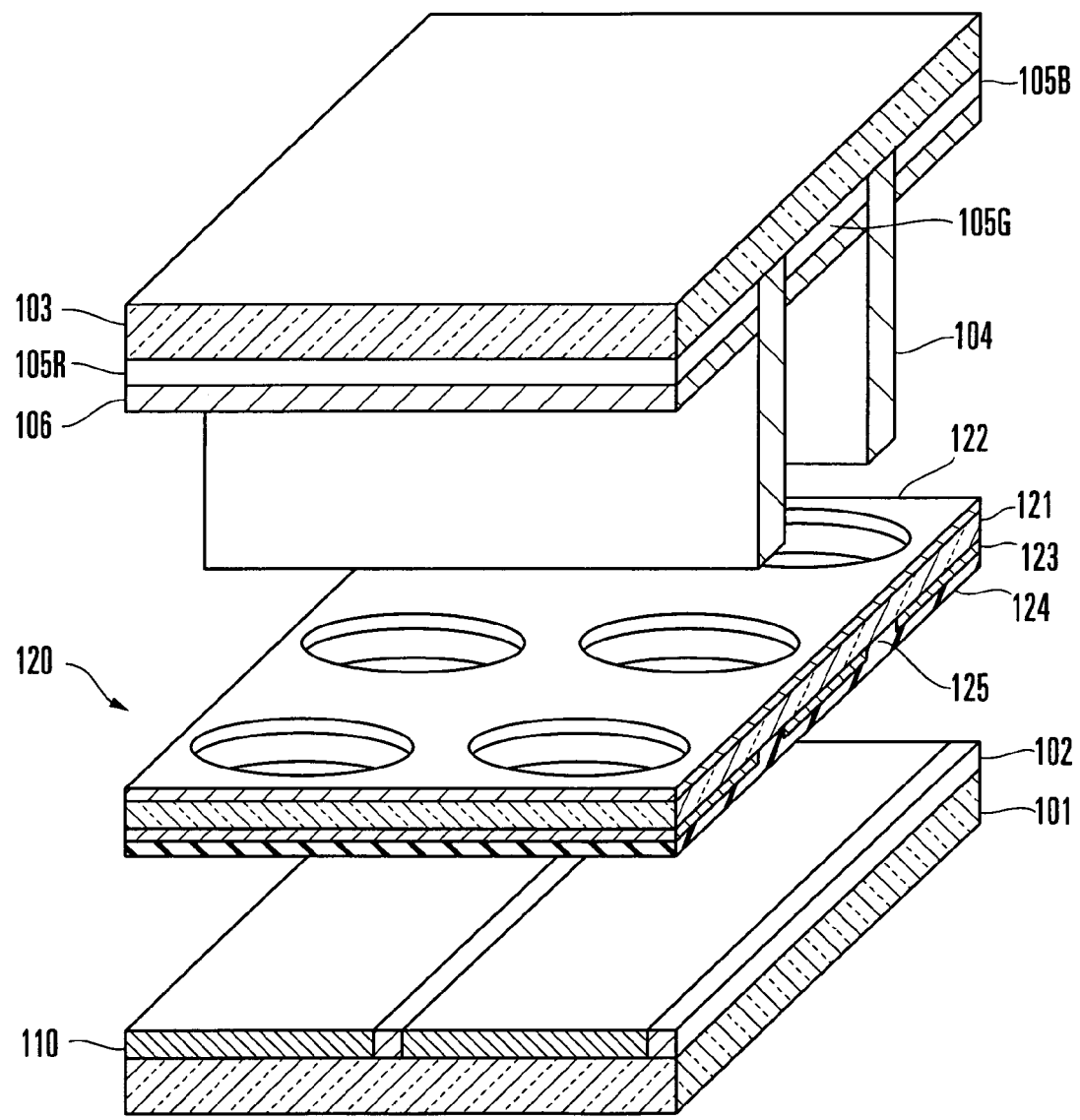
FIG. 5 is an exploded perspective view of the main part showing a conventional flat display.

A flat display according to the first embodiment of the present invention will be described with reference to FIG. 1. In the following description, the same constituent elements as those shown in FIG. 5 are denoted by the same names and reference numerals, and a description thereof will partly be omitted.

Figure 1:
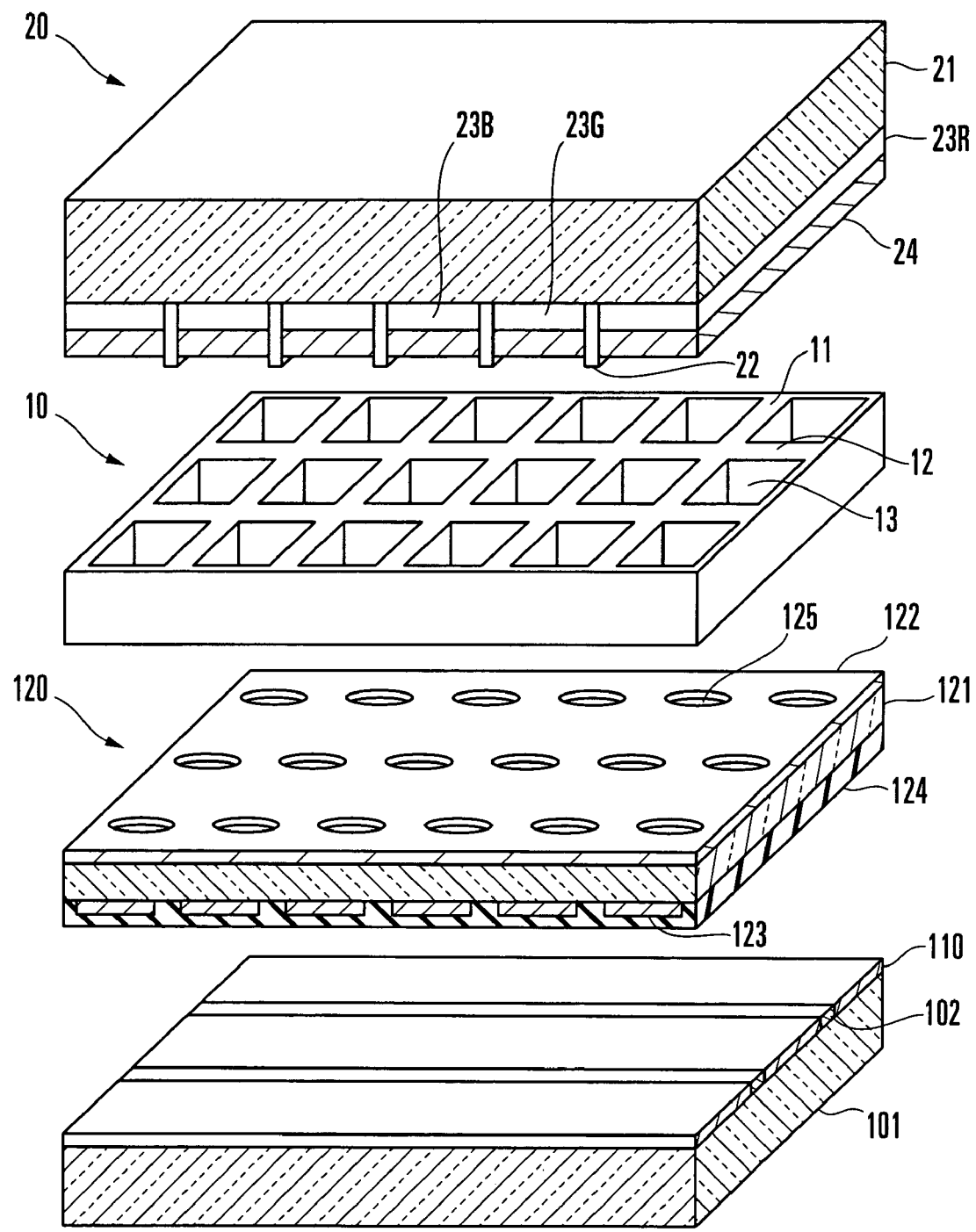
FIG. 1 is an exploded perspective view of the main part of a flat display according to the first embodiment of the present invention.

As shown in FIG. 1, the flat display according to the first embodiment includes a substrate 101 which is made of glass or the like and to one surface of which substrate ribs 102 and cathodes 110 fixed with nano tube fibers to serve as an electron-emitting source are disposed, and a front glass structure 20 with a front glass plate 21 which is at least partly transparent. The front glass plate 21 is comparatively thick to stand the atmospheric pressure. The substrate 101 and front glass structure 20 are arranged to oppose each other at a predetermined gap through a frame-shaped glass spacer 51 arranged along their peripheral portions.

Figure 2:
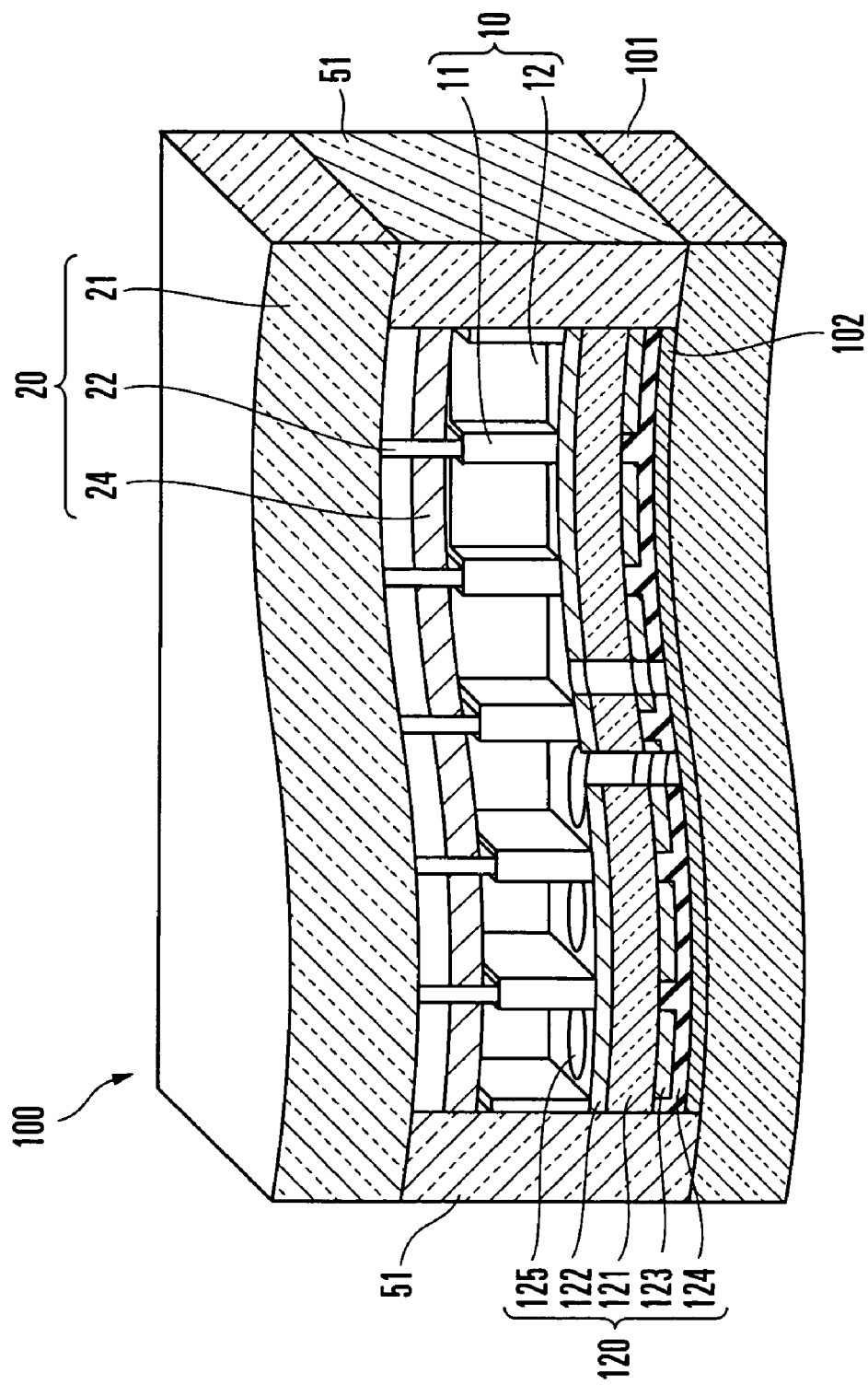
FIG. 2 is a longitudinal sectional view showing a state wherein the flat display shown in FIG. 1 is assembled.

The glass spacer 51, the substrate 101 adhered to the glass spacer 51 with low-melting frit glass, and the front glass structure 20 form an envelope 100, as shown in FIG. 2. A gate electrode structure 120 and spacer 10 substantially parallel to each other between the substrate 101 and front glass structure 20 are disposed in the envelope 100. The interior of the envelope 100 is held at a vacuum degree on the order of $10^{-5}$ Pa.

The front glass structure 20 includes the front glass plate 21 disposed substantially parallel to the substrate 101, a plurality of front ribs 22, vertically extending from that surface of the front glass plate 21 which opposes the spacer 10, at predetermined intervals in a direction perpendicular to the substrate ribs 102 and cathodes 110, band-like green-, blue-, and red-emitting phosphor screens 23G, 23B, and 23R arranged in a predetermined order in regions sandwiched by the front ribs 22, and metal-backed films 24 serving as anodes and formed on those surfaces of the phosphor screens 23G, 23B, and 23R which oppose the spacer 10.

The gate electrode structure 120 includes a glass plate 121 parallel to the substrate 101, a field control electrode 122 formed on a front glass plate 103 side surface on the glass plate 121, band-like gate electrodes 123 formed on the substrate 101 side surface of the glass plate 121 to respectively correspond to the phosphor screens 23B, 23G, and 23R, and an insulating layer 124 formed on the substrate 101 side surface of the glass plate 121 to cover the gate electrodes 123. A plurality of electron-passing holes 125, through which the field control electrode 122, glass plate 121, gate electrodes 123, and insulating layer 124 communicate with each other in the electron traveling direction, are formed in those regions of the gate electrode structure 120 where the gate electrodes 123 and cathodes 110 intersect.

The spacer 10 is integrally formed like a matrix from a plurality of longitudinal members 11 which have a predetermined height in the traveling direction (direction perpendicular to the main surface of the front glass plate 21) of electrons extracted from the cathodes 110 and are disposed parallel to each other at predetermined intervals in the direction of plate thickness, and a plurality of lateral members 12 which are disposed parallel to each other at predetermined intervals in the direction of plate thickness to be perpendicular to the longitudinal members 11. The long plate-like longitudinal members 11 and lateral members 12 which intersect each other are arranged such that their longitudinal directions and thickness directions are perpendicular to the electron traveling direction and their widthwise direction is parallel to the electron traveling direction. The lengths of the longitudinal members 11 and lateral members 12 in the widthwise direction (the electron traveling direction) define the height of the spacer 10.

A plurality of rectangular openings 13 formed by the plurality of longitudinal members 11 and lateral members 12 respectively correspond to the electron-passing holes 125 of the gate electrode structure 120. Thus, the electrons extracted from the cathodes 110 pass through the electron-passing holes 125 and openings 13 and are guided to the front glass structure 20 without being shielded.

FIG. 2 shows a flat display in which the spacer 10 and gate electrode structure 120 are built into the vacuum space in the envelope 100 formed of the front glass structure 20, substrate 101, and glass spacer 51. Referring to FIG. 2, the gate electrode structure 120 and spacer 10 are sequentially stacked on the substrate 101. The lower end portions of the front ribs 22 of the front glass structure 20 abut against the upper end faces of the longitudinal members 11 which form the spacer 10. Thus, the front glass plate 21 is supported by the spacer 10 through the front ribs 22.

Figure 4:
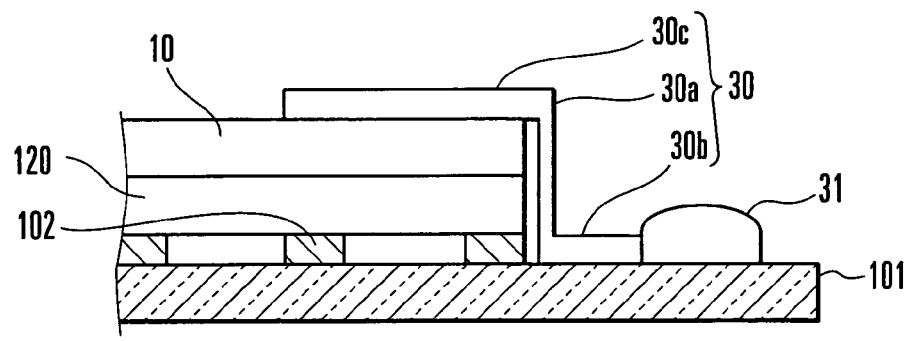
FIG. 4 is a sectional view of the main part showing a gate electrode structure and a spacer which is fixed to the surface of a substrate.

As shown in FIG. 4, the spacer 10 can be fixed to the substrate 101 with a hook 30. The hook 30 has a linear base 30a substantially perpendicular to the substrate 101, and a fixing portion 30b and tight contact portion 30c which vertically extend from the base 30a such that one end of the fixing portion 30b and one end of the tight contact portion 30c are connected to the two ends of the base 30a and the other end of the fixing portion 30b and the other end of the tight contact portion 30c extend in opposite directions. The fixing portion 30b is fixed to the substrate 101 and engages with the upper surface of the spacer 10 of the fixing portion 30b.

Two or more hooks 30 each having this structure are prepared, and are placed on the substrate 101 after the front glass structure 20 and spacer 10 are stacked. After that, the fixing portions 30b are adhered to the surface of the substrate 101 from the two ends of the substrate 101 with an adhesive such as frit 31. Thus, the tight contact portions 30c which are substantially parallel to the substrate 101 press the spacer 10 toward the substrate 101, and the gate electrode structure 120 is fixed as it is sandwiched between the substrate 101 and spacer 10.

Alternatively, the spacer 10 may be fixed to the glass spacer 51 with an adhesive such as frit. The spacer 10 and gate electrode structure 120 may be fixed by firmly sandwiching them by the substrate 101 and front glass structure 20.

The front glass plate 21 shown in FIG. 1 is formed with such a thickness that it can stand the atmospheric pressure. In this case, the front ribs 22 suffice as far as their distal end faces are leveled with at least the spacer 10 side surfaces of the metal-backed films 24. As shown in FIG. 1, the distal end faces of the front ribs 22 may slightly project from the metal-backed films 24 toward the spacer 10. In this manner, when the front glass plate 21 is thick, the front ribs 22 need not be high as in the conventional case. Thus, the manufacturing process can be shortened to decrease the cost.

According to this embodiment, since the gate electrode structure 120 can be held on the substrate 101 by the spacer 10, the distance between the gate electrodes 123 of the gate electrode structure 120 and the metal-backed films 24 which serve as the anodes can be increased easily. In this case, the glass spacer 51 which forms the envelope 100 only need be formed high.

Figure 3:
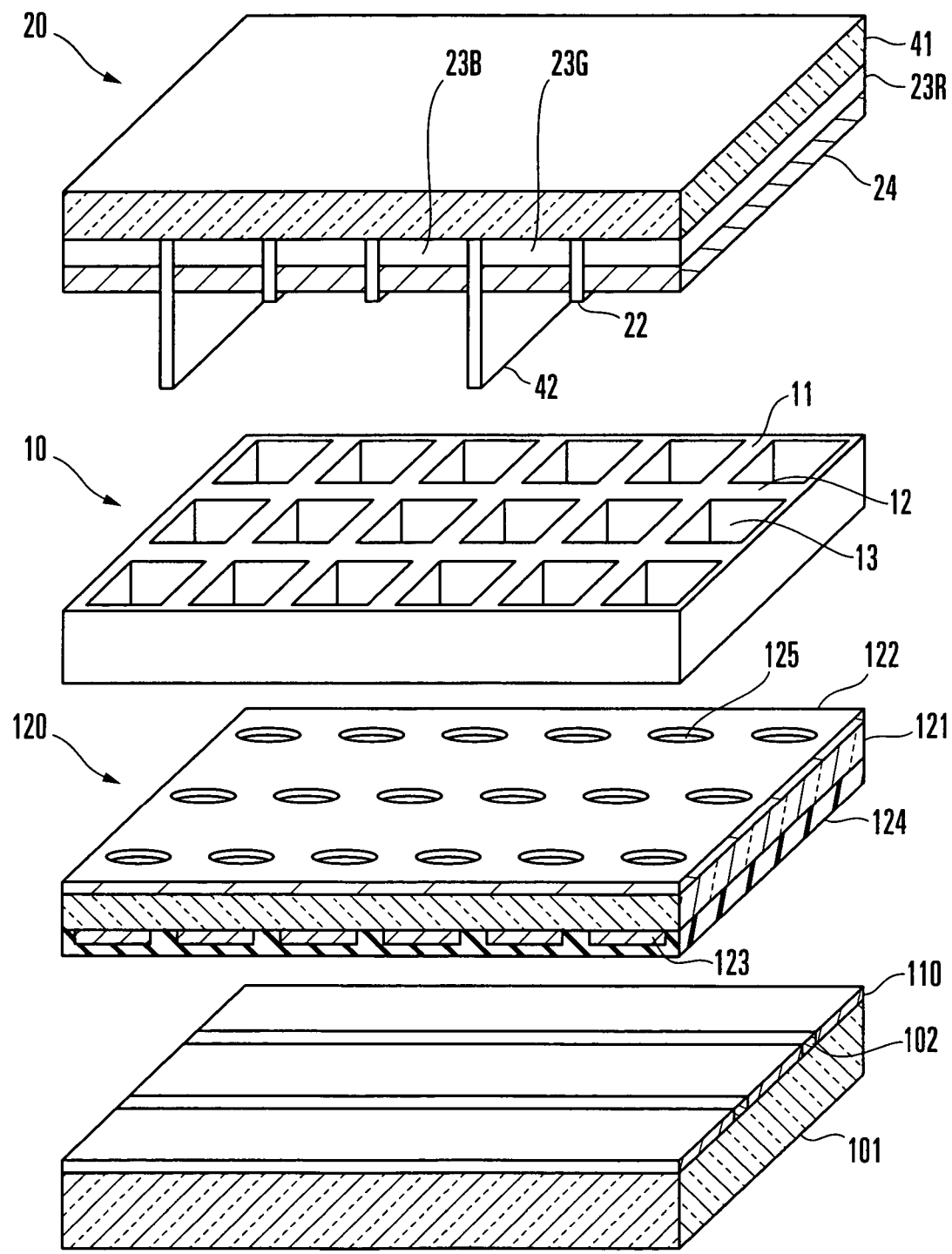
FIG. 3 is an exploded perspective view of the main part of a flat display according to the second embodiment of the present invention.

The second embodiment of the present invention will be described with reference to FIG. 3. A front glass plate 41 shown in FIG. 3 is formed thinner than the front glass plate 21 shown in FIG. 1. In this case, of a plurality of front ribs 22, front ribs 42 which are long in the direction of height may be formed at arbitrary pitches (for example, as every third phosphor screen). With this structure, even if the front glass plate 41 is thin, the strength of the front ribs 42 increases, so that the front glass plate 41 can be prevented from being broken by the atmospheric pressure.

A method of manufacturing the spacer 10 will be described.

As the spacer 10 has a matrix-like planar shape, it can facilitate alignment for screen printing when compared to the case that uses the conventional front ribs 104. More specifically, insulating paste containing low-melting frit is repeatedly printed by screen printing until it reaches a predetermined height. Thus, the spacer 10 with which the distance between the gate electrodes 123 and metal-backed films 24 is about 2.0 mm to 4.0 mm and which is made of an insulator is formed. At this time, the longitudinal members 11 and lateral members 12 can be formed thick to have a thickness of 0.2 μm to 0.3 μm.

The spacer 10 may be manufactured by etching or press molding. When etching is employed, a matrix-like shaped resist pattern as described above is formed on a stainless steel plate or a metal plate made of a 42-6 alloy or the like, and the stainless steel plate or metal plate is etched by using the resist pattern as a mask to form the spacer 10. When press molding is employed, a matrix-like mold as described above is formed, and a stainless steel plate or a metal plate made of the 42-6 alloy or the like is pressed with this mold to form the spacer 10.

In this manner, according to the embodiments described above, as the matrix-like spacer 10 is formed between the front glass structure 20 and gate electrode structure 120, the distance between the gate electrodes 123 and the metal-backed films 24 serving as the anodes can be increased, and abnormal electric discharge can be prevented. Also, a high voltage can be applied to the anodes to realize a high luminance.

According to the embodiments described above, as the spacer 10 is used, a high-resolution flat display can be realized. As the gate electrode structure 120 can be held on the substrate 101 by the spacer 10, the distance between the gate electrodes 123 and the metal-backed films 24 serving as the anodes can be increased.

When the spacer 10 made of a metal material is to be applied to a flat display, a voltage may be applied to the spacer 10. Then, electrons extracted from the cathodes 110 converge to the central portions of the openings 13, so that electron leak to adjacent phosphors can be prevented to suppress crosstalk. The voltage to be applied to the spacer 10 is desirably lower than the voltage to be applied to the metal-backed films 24 which serve as the anodes. When the spacer 10 is to be formed by screen printing, a metal layer, or a multilayer made of an insulating layer and metal layer may be formed.

The surface of the spacer 10 may be coated with a material, e.g., chromium oxide, having a small secondary emission ratio. Then, electrification troubles on the surface of the spacer 10 can be prevented. The spacer 10 can be coated by sputtering or spraying.

According to the present invention, as the spacer having a substantially matrix-like section is disposed between the front glass plate and gate electrode substrate, the gap between the anode electrodes and gate electrodes can be increased. Abnormal electric discharge can be prevented to realize high resolution.

What is claimed is:

1. A flat display comprising:
   a front glass plate which is at least partly transparent;
   a substrate which is arranged to oppose said front glass plate through a vacuum space;
   a cathode which is formed on said substrate and has an electron-emitting source made of nano tube fibers;
   a gate electrode which has an electron-passing hole in a direction perpendicular to said substrate and is arranged in the vacuum space away from said cathode to oppose said substrate;
   a phosphor screen and anode sequentially stacked on a surface of said front glass plate which opposes said substrate;
   a matrix spacer which is stacked between said gate electrode and front glass plate and has a plurality of openings each corresponding to the electron-passing hole; and
   a plurality of front ribs which vertically extend from said front glass plate toward said spacer at a predetermined interval,
   wherein said phosphor screen and anode are arranged in a region of said front glass plate which is sandwiched by said front ribs.

2. The display according to claim 1, wherein some of said front ribs project more toward said spacer than remaining ones of said front ribs every predetermined number of front ribs.

3. The display according to claim 1, wherein said spacer contains metal, and when a voltage is applied to said spacer, crosstalk is prevented.

4. The display according to claim 1, wherein said spacer is formed by any one method selected from printing, etching, and press molding.

5. The display according to claim 1, further comprising a hook member in which a proximal end portion is fixed to said substrate and a free end portion presses and fixes said spacer against said substrate.

6. The display according to claim 5, wherein said gate electrode is stacked between said substrate and spacer, and is fixed to said substrate together with said spacer by a pressing force of said fixing member.

7. The display according to claim 1, wherein
said front glass plate, said substrate, and a matrix glass spacer formed along peripheral portions of said front glass plate and substrate form an envelope in which a vacuum space is held, and
said gate electrode and spacer are stacked in the vacuum space in said envelope to be in contact with said substrate and front glass plate.

* * * * *